US011544766B1

(12) United States Patent
Medina, III et al.

(10) Patent No.: US 11,544,766 B1
(45) Date of Patent: Jan. 3, 2023

(54) POINT OF SALE MAPPING SYSTEMS

(71) Applicant: United Services Automobile Association (USAA), San Antonio, TX (US)

(72) Inventors: Reynaldo Medina, III, San Antonio, TX (US); William Preston Culbertson, II, San Antonio, TX (US); Susan Elizabeth Wright, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 19 days.

(21) Appl. No.: 16/913,284

(22) Filed: Jun. 26, 2020

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0631* (2013.01); *G06Q 30/0238* (2013.01); *G06Q 30/0623* (2013.01); *G06Q 30/0639* (2013.01)

(58) Field of Classification Search
CPC ..... G06Q 30/0601–0645; G06Q 30/08; G06Q 30/0238
USPC ................................................. 705/26.1–27.2
See application file for complete search history.

(56) References Cited

U.S. PATENT DOCUMENTS

| | | | | |
|---|---|---|---|---|
| 7,797,204 | B2 * | 9/2010 | Balent | G06Q 30/0633 705/28 |
| 8,126,784 | B1 * | 2/2012 | Agarwal | G06Q 10/00 705/28 |
| 10,319,021 | B1 * | 6/2019 | Manyam | G06Q 30/0205 |
| 2010/0262554 | A1 * | 10/2010 | Elliott | H04W 4/18 345/173 |
| 2017/0318430 | A1 * | 11/2017 | Ganti | G06V 40/16 |
| 2021/0118037 | A1 * | 4/2021 | Bradley | G06Q 30/0625 |
| 2021/0182931 | A1 * | 6/2021 | Gupta | G06Q 30/0631 |

OTHER PUBLICATIONS

Rejin Paul James, An Application for Keeping Track of Food Item Expiration, University of South Carolina Scholar Commons, Jan. 1, 2013, accessed at [https://scholarcommons.sc.edu/cgi/viewcontent.cgi?article=3552&context=etd] (Year: 2013).*

* cited by examiner

*Primary Examiner* — Jeffrey A. Smith
*Assistant Examiner* — Lindsey B Smith
(74) *Attorney, Agent, or Firm* — Fletcher Yoder P.C.

(57) ABSTRACT

A system includes one or more point of sale systems and processing circuitry. The processing circuitry is configured to receive purchase data for a plurality of purchases made by a purchaser via the one or more point of sale systems over a time period, wherein the purchase data includes an identifier of the purchaser, a timestamp, and a type of good. The processing circuitry is configured to determine a frequency with which the purchaser purchased a type of good over the time period based on the purchase data, determine a target time at which the purchaser should next purchase the type of good based on the purchase data and the frequency, and instruct output of a notification in response to receipt of an indication that the purchaser is attempting to purchase the type of good using the one or more point of sale systems prior to the target time.

12 Claims, 2 Drawing Sheets

POINT OF SALE MAPPING SYSTEMS

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A point of sale (POS) is generally understood to reference a place and/or a point in time where a transaction (e.g., a retail or service transaction) is performed. Traditionally, at the point of sale, a provider (e.g., a merchant or service provider) coordinates with a purchaser (e.g., a customer) to exchange goods and/or services for payment. As a specific example, a purchaser may identify a desired purchase (e.g., a particular item of merchandise or a particular service), and the provider may then determine and/or request payment of an amount owed by the purchaser for the desired purchase. Upon review of the amount, the purchaser may then pay the provider the amount via a payment method.

SUMMARY

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In an embodiment, a purchase management guidance system includes one or more point of sale systems configured to facilitate transactions, wherein each of the one or more point of sale systems is disposed at a respective point of sale location. The purchase management guidance system also includes processing circuitry configured to receive purchase data for a plurality of purchases made by a purchaser via the one or more point of sale systems over a time period, wherein the purchase data includes an identifier of the purchaser, a timestamp, and a type of good. The processing circuitry is further configured to determine a frequency with which the purchaser purchased a type of good over the time period based on the purchase data, determine a target time at which the purchaser should next purchase the type of good based on the purchase data and the frequency, and instruct output of a notification on a graphical user interface in response to receipt of an indication that the purchaser is attempting to purchase the type of good using the one or more point of sale systems prior to the target time.

In an embodiment, a method of managing purchase data and providing guidance includes scanning a code associated with an item as part of a purchase with a point of sale system and obtaining an identifier of a purchaser of the item using the point of sale system. The method also includes retrieving, using processing circuitry, data indicative of a type of the item from one or more databases and based on the code. The method also includes generating, using the processing circuitry, a mapping of the data indicative of the type of the item to the identifier of the purchaser. The method also includes retrieving, using the processing circuitry, a target time that is specific to the type of the item and the purchaser from the one or more databases, wherein the target time is indicative of a time at which the purchaser is recommended to purchase the item according to prior purchasing patterns of the purchaser. The method also includes instructing, using the processing circuitry, the point of sale system to provide a notification to the purchaser in response to a current time of the purchase being prior to the target time.

In an embodiment, a system for performing transactions and providing transaction mapping guidance includes one or more point of sale systems configured to facilitate transactions, wherein each of the one or more point of sale systems is disposed at a respective point of sale. The system also includes processing circuitry configured to receive purchase data for a plurality of purchases made by a purchaser via the one or more point of sale systems, wherein the purchase data includes an identifier of the purchaser, a timestamp, a location, and a type of good. The processing circuitry is also configured to determine a frequency with which the purchaser purchased a first type of good over a time period based on the purchase data, determine a difference between a last time of a last purchase of the first type of good and a current time of a current purchase of the first type of good based on the purchase data, and instruct output of a notification via a mapping application in response to determining that the difference does not correspond to the frequency, wherein the notification includes a guidance map that indicates a respective location of the last purchase.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
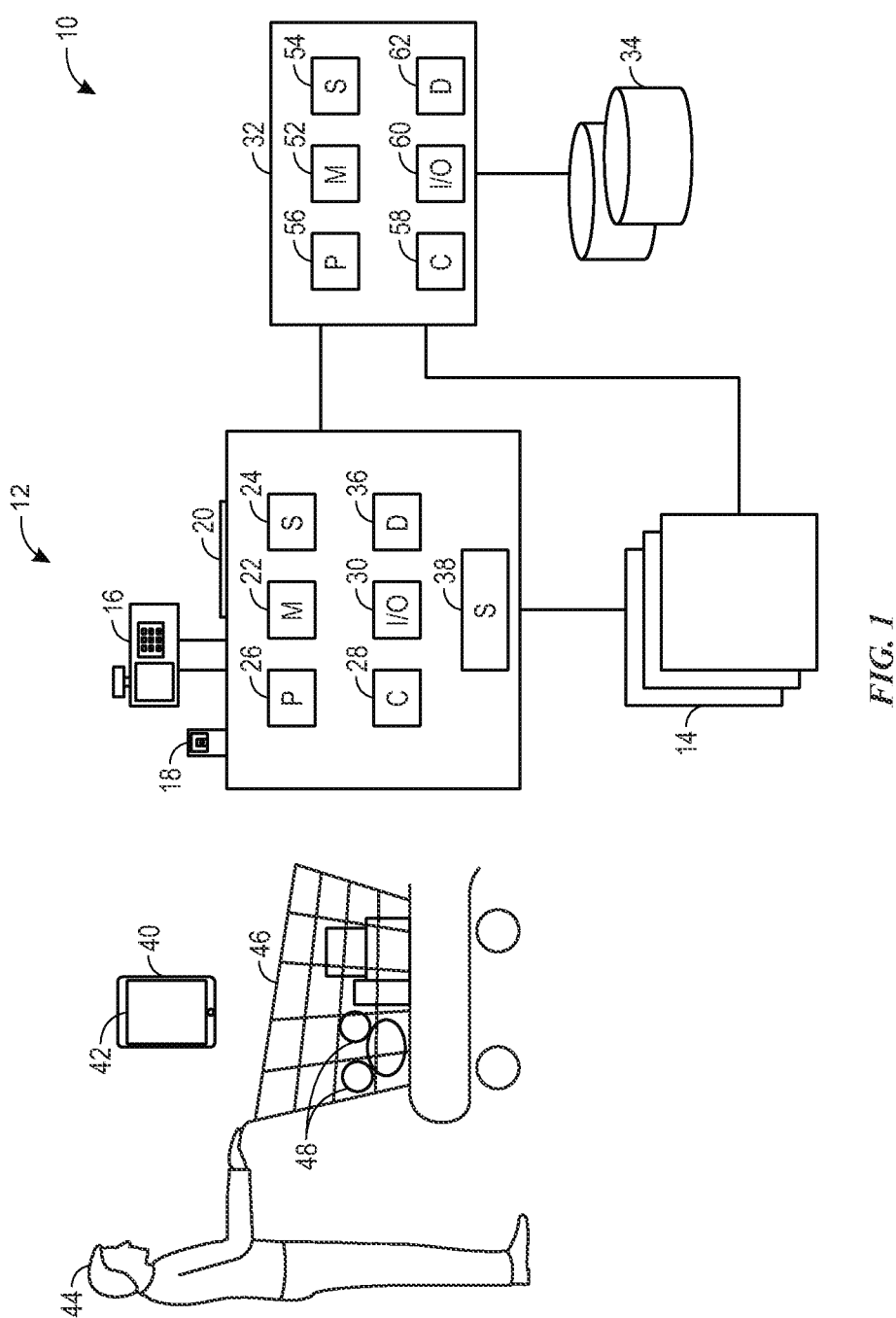
FIG. 1 is a schematic diagram of a purchase management system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are directed to systems and methods for tracking purchases and/or facilitating purchases (e.g., at a point of sale). This may include mapping physical locations of purchases (e.g., via global positioning satellite systems), providing relevant routing information to the physical locations, and/or triggering mapping of relevant purchase data to one or more central databases based on an aspect of a transaction (e.g., scanning of a good for purchase). In particular, a purchase management system may obtain purchase data via a point of sale system, analyze the purchase data, and provide a notification (e.g., recommendation) based on the purchase data. In some embodiments, the notification may include a map with relevant routing information to a physical location of a previous purchase, if the physical location (not an online purchase) corresponds to the previous purchase, for example.

The point of sale system may be defined as a hardware system that is configured to process payments for goods and/or services. The point of sale system may utilize software, which may be embedded in the hardware (e.g., including tangible, non-transitory, computer-readable media), to perform certain operations associated with the purchase. For example, the point of sale system may include a terminal that is anchored to a checkout counter (e.g., at a retail store) and/or the point of sale system may include a portable device (e.g., a portable barcode scanner). In some embodiments, the point of sale system may include a purchaser point of sale system (or device) that cooperates with a provider point of sale system (or device), such as when a purchaser uses a mobile phone (e.g., having a mobile payment application stored thereon) to make a mobile payment.

Regardless of the features of the point of sale system, the point of sale system may provide the purchase data (e.g., for each purchase made using the point of sale system) to a central management system of the purchase management system. The purchase data may include an identifier of the purchaser (e.g., a unique identifier), a timestamp for the purchase (e.g., date and/or time), location, and/or characteristics of the good(s) and/or or service(s) purchased (e.g., a price, a type; a quantity, such as a weight or a unit size; and/or an expiration date for the good(s)). In an embodiment, multiple point of sale systems (e.g., for multiple retail stores) may provide the purchase data over a time period (e.g., a month, several months, a year, or more; for multiple purchases made by multiple purchasers at multiple retail stores). In an embodiment, the central management system may analyze the purchase data to determine one or more purchase parameters, such as a frequency (e.g., an average or a median frequency) with which each purchaser purchased each type of good and/or service over the time period. For example, the central management system may determine that a first purchaser purchased one gallon of milk every five days over the time period, while a second purchaser purchased one gallon of milk every seven days over the time period.

The central management system may also use the purchase data and/or the one or more purchase parameters, such as the frequency, to determine and to instruct provision of the notification (e.g., an audible alarm; a light; a symbol; a text message; a map). For example, the central management system may use the purchase data (e.g., for a last purchase) and the frequency to determine a target time, which is representative of an estimated date (e.g., recommended date) at which the purchaser should buy (e.g., buy, replenish, or buy again) the good and/or service. As the purchaser utilizes the point of sale system to purchase the good and/or service, the central management system may receive the purchase data (e.g., for a current purchase), determine and/or access the target time, and instruct provision of the notification to alert the purchaser that the target time to buy the good and/or service has not been reached. This may also take into account location data and likely travel schedule (e.g., data indicative of when the purchaser is likely to pass within a threshold distance of a location, such as a retail store, that provides the good and/or service) to provide a map to serve as a guide to a point of sale location.

The purchase management system may additionally or alternatively provide other types of notifications to the purchaser. For example, the purchase management system may provide a notification to alert the purchaser that the target time to buy the good and/or service has been reached and/or a notification to alert the purchaser that the target time to buy the good and/or service is approaching (e.g., in one, two, three, ten, thirty, or more days). The notification may be provided via the point of sale system, such as via the purchaser point of sale system (e.g., via the mobile application stored thereon) and/or the provider point of sale system. The frequency, the target time, and the notification may be specific (e.g., unique) to the purchaser and/or specific to the good and/or service. Thus, for each purchaser, the purchase management system may determine a respective frequency, a respective target time, and/or a respective notification for each one of multiple different goods and/or services. The disclosed embodiments may facilitate transactions and assist the purchaser to purchase the good(s) and/or service(s) that the purchaser is likely to need. The disclosed embodiments may also add functionality to the point of sale system, thereby making the point of sale system more versatile, efficient, and useful to the purchaser, for example. To facilitate discussion, the examples below are generally discussed in the context of the purchase of good (s); however, it should be appreciated that the embodiments may be adapted for use with the purchase of service(s), such as the purchase of car maintenance services, such as oil changes. Additionally, the present embodiments may obtain the purchase data related to multiple POS transactions (including purchases, returns, in-store transactions, online transactions) from multiple point of sale systems to carry out the disclosed techniques.

FIG. 1 is a schematic diagram of a purchase management system 10 (e.g., purchase management guidance system) incorporating a point of sale (POS) system 12 in accordance with embodiments of the present disclosure. The purchase management system 10 may include various computers, terminals, software applications, and networks. The POS system 12, which may be considered a component of the purchase management system 10, may be defined as a hardware system for processing payments for transfer of goods (e.g., items; merchandise) from a provider to a purchaser. It should be noted that, in addition to processing the payments for the transfer of goods, the POS system 12 may also operate to facilitate returns of goods. Each of these functions may be considered a POS transaction. Further, it should be noted that the POS system 12 may be considered one of various other systems 14 (e.g., other POS systems) that operate as part of the purchase management system 10.

The POS system 12 and the various other systems 14 may perform specific or varied functions related to POS transactions.

In accordance with an embodiment, the POS system 12 may enable monitoring of the purchaser's travel patterns and also locations of transactions. Thus, present embodiments may detect and/or predict when the purchaser will be in close proximity to an item of need. Determining whether an item is needed (e.g., replenishment or replacement is likely desired) will be discussed below. However, when an item is deemed in need, present embodiments may also identify a nearby source (e.g., previous location where a like item was obtained) and provide a map to the associated point of sale.

The POS system 12 and the various other systems 14 may obtain purchase data related to purchases completed by the purchaser. The purchase data may include an identifier of the purchaser (e.g., a unique identifier), a timestamp for the purchase (e.g., date and/or time), location information and/or characteristics of the good(s) purchased (e.g., a price, a type; a quantity, such as a weight or a unit size; and/or an expiration date for the good(s)). To obtain the purchase data, the POS system 12 may include various devices, such as a provider POS system 16, a scanner 18 that is configured to scan a code (e.g., barcode) associated with an item, and/or a scale 20 that is configured to weigh the item. The provider POS system 16 may include a touch screen display and/or a card reader, for example. In this way, the provider POS system 16 may enable the purchaser to input the identifier (e.g., a phone number; a card, such as a payment card). The scanner 18 may enable the POS system 12 to obtain various characteristics of the good(s) purchased during the POS transactions and characteristics associated with the transaction (e.g., location and mapping data). For example, the scanner 18 may enable the POS system 12 to identify the good(s), including characteristics of the good(s) (e.g., a price, a type, a quantity, and/or unit size, such as two gallons of milk, one pack of a dozen eggs; and/or an expiration date). The POS system 12 may identify the good(s) by accessing a database and using the code (or other scanned information) to search the database for the good(s) and their associated characteristics, although the POS system 12 may utilize any other techniques to obtain these characteristics of the good(s). The scale 20 may enable the POS system 12 to obtain other characteristics of the good(s) purchased during the POS transactions, such as respective weights of the items (e.g., of a bunch of fruit).

The POS system 12 may also include a memory device 22 and/or storage device 24 that stores code (or instructions) and a processor 26 that functions to process the code and control operations in response to the code. The POS system 12 may also include a communication component 28 and input/output (I/O) ports 30 that operate to facilitate communication between the POS system 12 and other components of the purchase management system 10. The memory device 22, storage device 24, processor 26, the communication component 28, and/or I/O ports 30 may be integral with or embedded in the POS system 12 to perform certain operations associated with the POS transactions. The processor 26 may utilize the communication component 28 to access a time via a network, and the POS system 12 may utilize the time to provide timestamps for the POS transactions. However, it should be appreciated that the POS system 12 may additionally or alternatively include an internal clock to provide the timestamps for the POS transactions, or the timestamps for the POS transactions may be obtained in any other suitable manner.

The POS system 12 may provide the identifier, the timestamp, and the characteristics of the good(s) of the POS transactions to a central management system 32 of the purchase management system 10. Furthermore, the POS system 12 may provide this information to the central management system 32 for each POS transaction carried out using the POS system 12 over a time period (e.g., a month, several months, a year, or more), and the various other systems 14 may similarly provide this information to the central management system 32 for each POS transaction carried out by the various other systems 14 over the time period. In this way, the central management system 32 may obtain purchase data from multiple transactions (e.g., associated with multiple purchasers and multiple retail stores). Among the purchase data, location and mapping data may be provided to facilitate provision of a map to the relevant point of sale system 12.

For each purchaser, the central management system 32 may aggregate, analyze, and/or store the purchase data collected over the time period. For example, the central management system 32 may use the identifier provided at each POS transaction to link the purchase data to the purchaser. The central management system 32 may then use the purchase data to determine a notification (e.g., appropriate notification) and to instruct provision of the notification to the purchaser. As discussed in more detail below, the notification may be an audible alarm, a text message, a pop-up notification, or any other suitable type of notification to present information to the purchaser.

To provide personalized and accurate notifications that are based on past purchasing behavior of the purchaser, the central management system 32 may determine one or more personalized purchase parameters for the purchaser based on the purchase data obtained over the time period. This purchase data may be mapped to a database based on type and related characteristics for efficient assembly and analysis of the purchase data. In an embodiment, the one or more purchase parameters may include a frequency with which the purchaser purchased each good (e.g., type or category of good) over the time period. The frequency may be based on an average or a median frequency with which the purchaser purchased the good over the time period. For example, the central management system 32 may determine that the purchaser purchased milk at a frequency of one gallon of milk per seven days on average. It should be appreciated that a respective frequency may be determined for each good that was repeatedly purchased by the purchaser over the time period, or at least for some of such goods. The central management system 32 may determine and store the frequency (e.g., in a database 34).

Furthermore, the central management system 32 may utilize the frequency to determine a target time for each good. The target time may be representative of an estimated date (e.g., recommended date) at which the purchaser should buy (e.g., buy, replenish, or buy again) the good. More particularly, the central management system 32 may use a timestamp associated with a last purchase (e.g., most recent purchase) of the good and the frequency for the good to determine the target time for the good. As an example, the central management system 32 may determine that the purchaser should buy a gallon of milk on a first date (e.g., based on the last purchase date being one week prior to the first date, the last purchase being a gallon of milk, and the frequency with respect to milk being a gallon of milk per week), and the central management system 32 may determine that the purchaser should buy a dozen eggs on a second date (e.g., based on the last purchase date being two weeks prior to the second date, the last purchase being a dozen eggs, and the frequency with respect to eggs being a dozen eggs per two weeks). It should be appreciated that a respective target time may be determined for each good that was repeatedly purchased by the purchaser over the time period, or at least for some of such goods (e.g., goods purchases recently; goods that are part of a current purchase). The central management system 32 may determine and store the target time (e.g., in the database 34). Furthermore, the central management system 32 may update the frequency and/or the target time over time, such as after each new purchase of the good (e.g., upon receipt of new purchase data from the POS system 12) or periodically (e.g., every week, month, six months, or year).

Then, in operation, the central management system 32 may receive the purchase data, which is indicative of the last purchase of the good(s) and a current purchase (e.g., attempted purchase) of the good(s). More particularly, the central management system 32 may receive the purchase data that is indicative of the current purchase via the POS system 12 as the purchaser uses the POS system 12 to purchase the good(s) (e.g., represented in FIG. 1 as a purchaser 44 having a cart 46 with goods 48). In response to receipt of the purchase data that is indicative of the current purchase via the POS system 12, for each good of the current purchase, the central management system 32 may access the purchase data that is indicative of the last purchase made via the POS system 12 (or another POS system) and the frequency in order to determine the target time. Or, if the target has already been determined and stored, the central management system 32 may access the target time. In any case, the central management system 32 may determine and/or access a respective target time for each good of the current purchase. Then, the central management system 32 may determine a time of the current purchase (e.g., based on the purchase data) and may compare the time to the target time. The central management system 32 may provide the notification in response to the time being prior to the target time for one or more of the goods of the current purchase to thereby notify the purchaser that the purchaser is buying (or attempting to buy) the good(s) prior to the target time (e.g., too close in time to the last purchase; prior to when the good(s) might be needed by the purchaser).

It should be appreciated that the central management system 32 may additionally or alternatively provide the notification in response to the time being after the target time to thereby notify the purchaser that the purchaser is buying (or attempting to buy) the good(s) after the target time (e.g., at an appropriate time relative to the last purchase; that the good(s) might be needed by the purchaser). It should be appreciated that the central management system 32 may additionally or alternatively provide the notification in response to the time being close to or within a certain range of the target time (e.g., within 1, 2, 3, or more days) to thereby notify the purchaser that the purchaser is buying (or attempting to buy) the good(s) near to, but prior to, the target time (e.g., slightly early; that the good(s) may not be needed by the purchaser). In an embodiment, the central management system 32 may provide a separate notification for each good to thereby provide information about each good that the purchaser is buying. It should be appreciated that the central management system 32 may not actually determine the target time, but instead may determine a difference between the time of the last purchase and the current time of the current purchase, and then compare the difference to the frequency. In such cases, the central management system 32 may instruct output of the notification should the difference not correspond to the frequency (e.g., exactly correspond, or within a range, such as within 1, 2, 3, 5, 10 or more days; the frequency is once every seven days, and the difference is only three days).

The notification provided to the purchaser may vary based on a difference between the time and target time. In an embodiment, the notification may include an audible alarm with a first tone if the time is prior to the target time and may include an audible alarm with a second tone if the time is after the target time. Similarly, the notification may include a red light or symbol if the time is prior to the target time, a yellow light or symbol if the time is within the range of the target time, and a green light or symbol if the time is after the target time. The notifications, and the ways in which the notifications might be provided to the purchaser, are discussed in more detail below. The notification may provide various types of information that may be helpful to purchaser as the purchaser buys good(s) using the POS system 12. Advantageously, the notification may be provided by the POS system 12 as the purchaser is buying or beginning the process of buying the good(s) using the POS system 12 (e.g., after being scanned by the scanner 18, but prior to payment). For example, the notification may be a separate notification for each good that is provided by the POS system 12 as or immediately after each good is scanned by the scanner 18 and prior to a subsequent good being scanned by the scanner 18 and/or prior to payment.

In an embodiment, the target time may be based at least in part on an expiration date (e.g., estimated or known expiration date) for the good, such as the expiration date for the good of the last purchase (e.g., obtained as part of the purchase data). For example, the good from the last purchase may have a known expiration date that has passed (e.g., the good is expired) prior to the current purchase of the good or that will pass soon after the current purchase of the good (e.g., in less than 1, 2, 3, 5, or 10 days). In such cases, the target time may be set to the expiration date (e.g., no later than the expiration date) or within a range of the expiration date (e.g., no later than 1, 2, 3, 5, or 10 days prior to the expiration date). Thus, the expiration date may essentially be used as a limit and may override the frequency to thereby provide a more useful target time for the purchaser and to avoid the provision of the notification that warns the purchaser not to purchase the good at times at which the good from the last purchase has expired or is nearly expired. It should be appreciated that the target time may vary based on other factors or inputs, such as any returns of good(s) made and/or a time of year (e.g., the purchaser may have purchasing patterns of buying more frequently buying fruit in a summer season, outdoor gear in a summer season, holiday goods in a winter season). For example, the central management system 32 may isolate the purchase data (e.g., historical purchase data) from a prior seasons or times of year that correspond to a current season or time of year, and then the central management system 32 may determine the frequency and the target time based on this isolated purchase data.

It should be appreciated that the target time may be a prediction and may predict a time at which the buyer is likely to need to buy the good (e.g., due to expiration date, past purchasing patterns). In an embodiment, the central management system 32 may utilize one or more algorithms to determine trends and to infer (e.g., predict) certain information. For example, the central management system 32 may utilize machine learning models to predict the target time for each good. As used herein, machine learning refers to algorithms and statistical models that may be used to perform a specific task without using explicit instructions, relying instead on patterns and inference. In particular, machine learning generates a mathematical model based on data (e.g., sample or training data, such as the purchase data obtained over the time period) in order to make predictions or decisions without being explicitly programmed to perform the task. Thus, as the purchase data is obtained, patterns of purchases may be considered and the frequency and/or target time may be updated.

In an embodiment, such as during availability of particular known examples of purchase data that correlate to future predictions, supervised machine learning may be implemented. In supervised machine learning, the mathematical model of a set of data contains both the inputs and the desired outputs. This data is referred to as "training data" and is essentially a set of training examples. Each training example has one or more inputs and the desired output. Through iterative optimization, supervised learning algorithms learn a function that can be used to predict the output (e.g., target time) associated with new inputs (e.g., purchase data). An optimal function will allow the algorithm to correctly determine the output for inputs that were not a part of the training data. An algorithm that improves the accuracy of its outputs or predictions over time is said to have learned to perform that task. Supervised learning algorithms include classification and regression, for example.

In an embodiment, it should be appreciated that the frequency and/or target time may be set (e.g., initially set or adjusted) by the purchaser. For example, the purchaser may be able to access (e.g., via the mobile application stored on a purchaser POS system 40) the frequency and/or the target time determined by the central management system 32 based on the purchase data, and the purchaser may be able to view and to provide an input (e.g., via a touch screen display) to adjust the frequency and/or target time (e.g., add or subtract days). As another example, the frequency and/or the target time may not be determined by the central management system 32 based on the purchase data, and instead, the purchaser may be able to provide an input to set the frequency and/or target time. Furthermore, the frequency and/or the target time may be predetermined (e.g., programmed) by the central management system 32. In such cases, the frequency and/or the target time may or may not be adjustable by the purchaser.

As noted above, the frequency and/or the target time may be specific the good (e.g., vary for each type of good). For example, a first type of good, such as a perishable food item, may have a shorter frequency than a second type of good, such as a nonperishable food item. Furthermore, in such cases, the target time may also be based on the expiration date (e.g., as input by the purchaser and/or obtained by the POS system 12). In an embodiment, the frequency and/or target time may be set by the purchaser, predetermined by the central management system 32, or the like during an initial period of use by the purchaser. Then, once the purchaser completes a sufficient number of purchases using the POS system 12 (and other POS systems), the frequency and/or target time may be updated by the central management system 32 to account for the purchaser's purchasing patterns and behaviors.

As noted above, the notification may be provided in any of a variety of ways. In an embodiment, the POS system 12 (e.g., the provider POS system 16 of the POS system 12) may include a display 36 (e.g., touch screen display) that functions to provide relevant information to parties involved in the transaction. In an embodiment, the display 36 may operate to provide the notification as instructed by the central management system 32. The display 36 may be any suitable type of display, such as a liquid crystal display (LCD), plasma display, or an organic light emitting diode (OLED) display, for example. The POS system 12 (e.g., the provider POS system 16 of the POS system 12) may also include a speaker 38 that may operate to provide the notification as instructed by the central management system 32. It should be appreciated that other types of output devices, such as one or more light emitters (e.g., capable of emitting light of different colors), may be included in the POS system 12 (e.g., the provider POS system 16 of the POS system 12).

In an embodiment, the POS system 12 may include the purchaser POS system 40 that cooperates with the provider POS system 16. For example, the purchaser POS system 40 may be a mobile phone of the purchaser that the purchaser uses to make mobile payments. However, the purchaser POS system 40 may be used to provide the notification even if the purchaser POS system 40 is not used to make mobile payments. The purchaser POS system 40 may also include a display 42 (e.g., touch screen display) that functions to provide relevant information to parties involved in the transaction. In an embodiment, the display 42 may operate to provide the notification upon instruction by the central management system 32. The display 42 may be any suitable type of display, such as a liquid crystal display (LCD), plasma display, or an organic light emitting diode (OLED) display, for example.

The central management system 32 may include a memory device 52 and/or storage device 54 that stores code (or instructions) and a processor 56 that functions to process the code and control operations in response to the code. The central management system 32 may also include a communication component 58 and input/output (I/O) ports 60 that operate to facilitate communication between the central management system 32 and other components of the purchase management system 10. In an embodiment, the central management system 32 may include a display 62 (e.g., touch screen display) that functions to provide relevant information to parties involved in the transaction.

It should be noted that the processors 26, 56 may be any type of computer processor or microprocessor capable of executing computer-executable code. Further, each of the processors 26, 56 may be representative of or include multiple processors that are part of the POS system 12 and the central management system 32, respectively, and that may perform processing operations herein described. The memory devices 22, 52 and the storage devices 24, 54 may be any suitable article of manufacture that can serve to store processor-executable code, data, or the like. These articles of manufacture may represent computer-readable media (e.g., any suitable form of memory or storage) that may store the processor-executable code used by the processors 26, 56 to perform the presently disclosed techniques. The memory devices 22, 52 and the storage devices 24, 54 may also store data, various software applications, and the like. It should be noted that non-transitory merely indicates that the media is tangible and not a signal.

The I/O ports 30, 60 may be interfaces that may communicatively couple to communication features (e.g., the communication components 28, 58) or peripheral components such as input devices (e.g., the provider POS system 16, a keyboard, a mouse, a microphone), sensors, input/output (I/O) modules, output devices, and the like. The communication components 28, 58 may facilitate network communications (e.g., wired or wireless) with remote systems devices. Thus, the I/O ports 30, 60 and the communication components 28, 58 may enable the POS system 12 and the central management system 32 to provide data to separate components of the purchase management system 10 and to receive data from those separate components.

It should be noted that the components described above with regard to the POS system 12 and the central management system 32 are exemplary components and these systems of the present disclosure may include additional or fewer components relative to what is shown. Additionally, as would be understood, it should be noted that the purchaser POS system 40 (e.g., mobile computer, mobile device, or desktop computer) may include components similar to those described as part of the POS system 12 and the central management system 32, such as a processor, a communication component, and a memory device. Furthermore, each of the various other systems 14 (e.g., additional POS systems) may include some or all of the features shown and described as being part of the POS system 12. While certain operations are described as being performed by the POS system 12 and certain operations are described as being performed by the central management system 32 to facilitate discussion, it should be appreciated that the operations may be divided in any suitable manner between the POS system 12, the central management system 32, and/or any other suitable computing system having one or more processors. It should also be noted that aspects of the purchase management system 10 may include or work in conjunction with a cloud-based computing system, server, or the like. For example, the central management system 32 may represent a bank of servers that perform operations for the POS systems, which may include the POS system 12 and the various other systems 14.

The POS system 12 and/or the central management system 32 may include circuitry or software that facilitates association of relevant data for data management purposes. For example, the identifier for the purchaser may be linked with the other purchase data for the purchaser (e.g., purchase data related to the good(s)), the frequency, and/or the target time as part of the storage process and to facilitate retrieval of the purchase data, the frequency, and/or the target time from a database, such as the database 34. This data accumulation and organization may provide for efficient notification upon receipt of the purchase data during the current purchase (e.g., as the purchaser uses the POS system 12 to buy good(s)).

Figure 2:
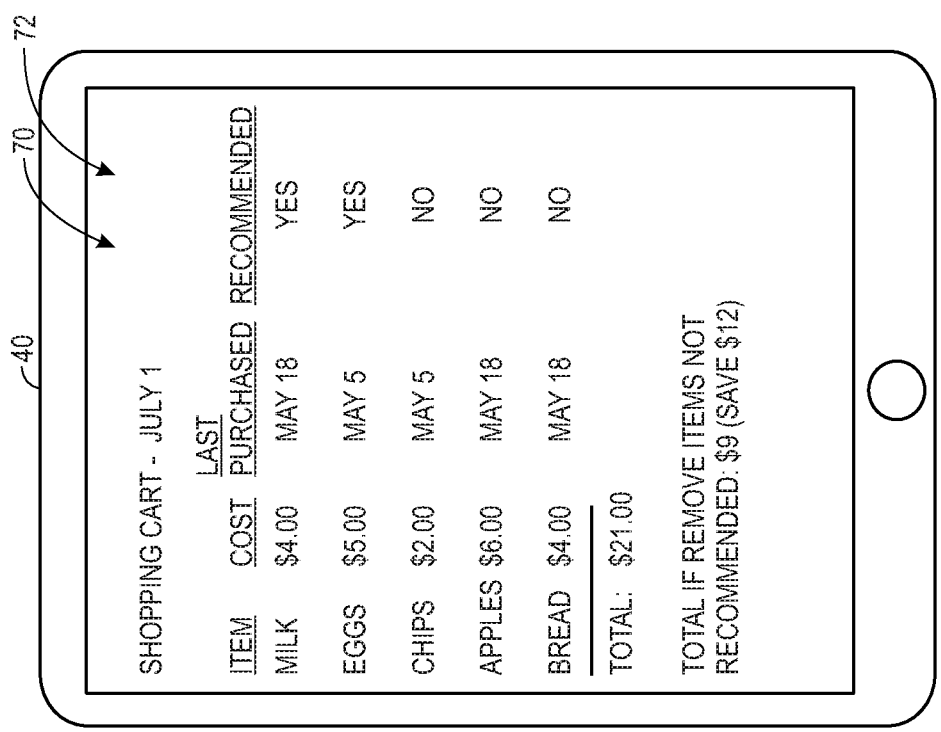
FIG. 2 is a schematic representation of a notification on a graphical user interface that may be presented by the purchase management system, in accordance with an embodiment of the present disclosure.

FIG. 2 is a schematic representation of a notification 70 on a graphical user interface (GUI) 72 that may be presented by the purchase management system of FIG. 1. For example, the GUI 72 may be displayed by the POS system (e.g., by the provider POS system and/or the purchaser POS system 40, as shown), the central management system, or some other feature of the purchase management system. As previously noted, software and hardware, such as that described with respect to the POS system and the central management system, may store, mine, and analyze the purchase data to determine the frequency and/or the target time (or may otherwise obtain or determine the frequency and/or the target time, such as via an input by the purchaser). Thus, the purchase data, the frequency, and/or the target time may be provided, via the GUI 72, for subsequent review by parties involved (e.g., purchaser and/or provider). Furthermore, the notification 70 that is appropriate given the purchase data, the frequency, and/or the target time may be provided, via the GUI 72, for review by the parties involved. In this way, the GUI 72 may operate to provide visual guidance (e.g., as the purchaser completes a purchase using the POS system).

As shown, the notification 70 may include a list of one or more goods that are in a cart of the purchaser during a current purchase, which may be determined by the purchase data obtained by the POS system. The notification 70 may also include, for each of the good(s) that are in the cart, a date of the last purchase and/or a recommendation to buy or not buy. As discussed above, the date of the last purchase may be obtained based on the purchase data for the last purchase, and the recommendation to buy or not buy may be based on the date of the last purchase, a date of the current purchase, and a target time, wherein the target time may be determined based on the date of the last purchase and a frequency with which the purchaser purchased the good over a time period (e.g., prior to the current purchase).

It should be appreciated that the notification 70 may include other information that may be relevant to the purchaser, such as a current price of each of the good(s) in the cart and/or a savings that might be realized should the purchaser remove the good(s) for which there is a recommendation to not buy. Furthermore, the information included in the notification 70 is merely exemplary, and this information may be omitted and/or presented in a different manner. It should also be appreciated that different and/or additional information may be included in the notification 70. For example, the notification 70 may include the frequency and/or the target time for each of the good(s) and/or a location of the last purchase of each of the good(s). The notification 70 may include a difference between a date of the current purchase and the target time (e.g., a number of days). The notification 70 may include the expiration date for each of the good(s).

It should be appreciated that the notification 70 may include selectable features (e.g., icons) or links, and thus, the notification 70 may include features that essentially operate as a menu. For example, the purchaser may select the "No" presented as the recommendation to not buy, and the purchaser may then be presented with relevant information, such as the frequency, the target time, and/or the difference between the date of the current purchase and the target time. It should also be appreciated that the GUI 72 may enable the purchaser to make adjustments, such as adjustments to the frequency and/or the target time.

Figure 3:
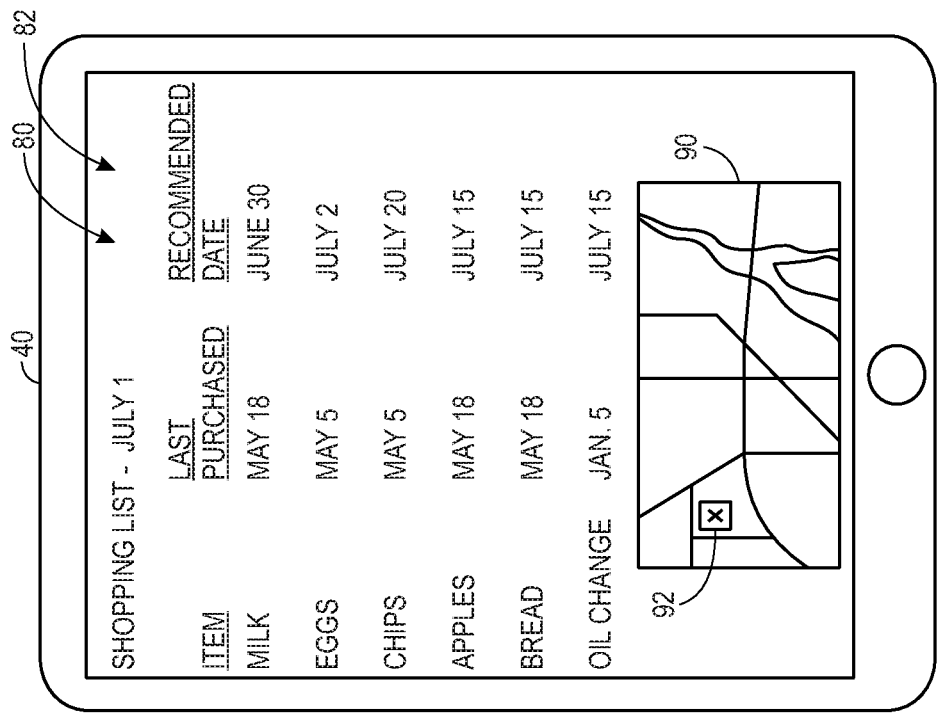
FIG. 3 is a schematic representation of another notification on a graphical use interface that may be presented by the purchase management system, in accordance with an embodiment of the present disclosure.

FIG. 3 is a schematic representation of a notification 80 on a graphical user interface (GUI) 82 that may be presented by the purchase management system of FIG. 1. For example, the GUI 82 may be displayed by the POS system (e.g., by the provider POS system and/or the purchaser POS system 40, as shown), the central management system, or some other feature of the purchase management system 10. Because the central management system, may store, mine, and analyze the purchase data to determine the frequency and/or the target time (or may otherwise obtain or determine the frequency and/or the target time, such as via an input by the purchaser), the central management system may also enable creation of the notification 80 that may present a list of good(s) and their respective target time(s) (e.g., recommended buy date) for consideration by the purchaser (e.g., prior to a shopping trip; periodically; on demand). For example, the notification 80 may be presented periodically (e.g., every 10 days) to show the purchaser all good(s) that have target time(s) within a purchase time period (e.g., within 30 days).

The notification 80 may also include, for each of the good(s) in the list, a date of the last purchase. Furthermore, the information included in the notification 80 is merely exemplary, and this information may be omitted and/or presented in a different manner. It should also be appreciated that different and/or additional information may be included in the notification 80. For example, the notification 80 may include the frequency and/or the target time for each of the good(s). The notification 80 may include the expiration date for each of the good(s).

In some embodiments, the notification 80 may include a map 90 (e.g., guidance map) that may be presented via the GUI 82. The map 90 may be presented via a mapping application alone or in combination with other types of data, such as the list of goods shown in FIG. 3. The map 90 may illustrate one or more locations 92, which may each be a location at which the purchaser previously purchased (e.g., last purchased) one or more of the good(s) in the list. The map 90 may also indicate the one or more good(s) purchased at each of the one or more locations 92. The one or more locations 92 for the map 90 may be determined by the central management system based on analysis of the purchase data (e.g., including the location) related to the prior purchase(s) by the purchaser for each good in the list.

In some embodiments, the one or more locations 92 for the map 90 may each be a recommended location at which the purchaser should complete the next purchase for the one or more good(s), as well as guidance instructions (e.g., a path) regarding how to travel to the recommended location from a home location and/or from a current location of the purchaser. For example, the central management system may receive location data for the purchaser (e.g., the current location of the purchaser) and the respective locations of prior purchases by the purchaser of each of the one or more good(s). Then, the central management system may determine the recommended location to be a closest location of the respective locations of the prior purchases by the purchaser to the current location of the purchaser. The central management system may generate the map 90 with the recommended location. In some embodiments, the recommended location may be based on a distance between the respective locations of the prior purchases and the current location of the purchaser, in-stock good(s)/status of good(s) (e.g., based on purchase data received at the central management system, such as via the POS system) at the recommended location and/or other nearby locations, a current price of the good(s) at the recommended location and/or other nearby locations (e.g., based on the purchase data received at the central management system, such as via the POS system), and so forth, to thereby provide the recommended location that is most beneficial to the purchaser. For example, the recommended location may be the location that is closest to the purchaser, or the recommended location may be the location that is slightly farther away from the purchaser, but that has a total lower price for the good(s) in the list.

It should be appreciated that the notification 80 may include selectable features (e.g., icons) or links, and thus, the notification 80 may include features that essentially operate as a menu. For example, the purchaser may select the recommended buy date for a particular good, and the purchaser may then be presented with relevant information, such as the frequency. It should also be appreciated that the GUI 82 may enable the purchaser to make adjustments, such as adjustments to the frequency and/or the target time. As another example, the purchaser may select the recommended buy date for the particular good, and the purchaser may then be presented with the map 90 with the location 92 at which to buy the particular good.

Present embodiments are believed to improve upon traditional point of sale mechanisms by providing guidance, data capture, analysis, comparison, and review capabilities. Further, present embodiments may be employed using traditional point of sale systems to improve their operation. In view of the features and functionality described in the present disclosure, it is believed that operations related to relevant transactions will be more efficient.

While only certain features and embodiments have been illustrated and described, many modifications and changes may occur to those skilled in the art, such as variations in sizes, dimensions, structures, shapes and proportions of the various elements, values of parameters, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A purchase management guidance system, comprising:
   one or more point of sale systems configured to facilitate transactions, wherein each of the one or more point of sale systems is disposed at a respective point of sale location;
   one or more processors; and
   memory storing instructions executable by the one or more processors to cause the one or more processors to:
      receive purchase data for a plurality of purchases made by a purchaser via the one or more point of sale systems over a time period, wherein the purchase data comprises an identifier of the purchaser, a respective timestamp, and a type of good for each purchase of the plurality of purchases;
      utilize a first portion of the purchase data as training data to generate one or more machine learning algorithms;
      input a second portion of the purchase data from a most recent purchase of the plurality of purchases into the one or more machine learning algorithms to determine a respective target time for a first type of good included in the most recent purchase of the plurality of purchases, wherein the respective target time represents a future recommended date at which the purchaser should next purchase the first type of good;
      update the one or more machine learning algorithms based on the second portion of the purchase data; and
      instruct output of a notification in response to receipt of an indication that the purchaser is attempting to purchase the first type of good using the one or more point of sale systems prior to the respective target time.

2. The purchase management guidance system of claim 1, comprising a terminal of a particular point of sale system of the one or more point of sale systems, wherein the indication indicates that the purchaser is attempting to purchase the first type of good using the particular point of sale system and the notification is provided via an output device of the terminal.

3. The purchase management guidance system of claim 2, wherein the output device comprises a display, and the notification is provided as a text message via the display.

4. The purchase management guidance system of claim 2, wherein the instructions are executable by the one or more processors to cause the one or more processors to instruct output of a different notification in response to receipt of another indication that the purchaser is attempting to purchase the first type of good using the particular point of sale system after the respective target time, the output device comprises a display or a light emitter, and the notification is provided with a first color indicator, and the different notification is provided with a second color indicator that is different than the first color indicator.

5. The purchase management guidance system of claim 1, wherein the one or more point of sale systems comprises a purchaser point of sale system, and the notification is provided via the purchaser point of sale system.

6. The purchase management guidance system of claim 1, wherein the one or more point of sale systems comprises a scanner that is configured to scan a code associated with the first type of good, and the indication that the purchaser is attempting to purchase the first type of good is based on the scanner scanning the code.

7. The purchase management guidance system of claim 1, wherein the purchase data comprises an expiration date for the type of good.

8. The purchase management guidance system of claim 1, wherein the instructions are executable by the one or more processors to cause the one or more processors to:
  input the second portion of the purchase data into the one or more machine learning algorithms to determine an additional respective target time at which the purchaser should next purchase a second type of good included in the most recent purchase of the plurality of purchases; and
  instruct output of an additional notification in response to receipt of an additional indication that the purchaser is attempting to purchase the second type of good using the one or more point of sale systems prior to the additional respective target time.

9. The purchase management guidance system of claim 1, wherein the purchase data comprises a location, and the instructions are executable by the one or more processors to cause the one or more processors to:
  track a respective location of each purchase of the plurality of purchases made by the purchaser; and
  instruct output of an additional notification via a mapping application in response to the respective target time at which the purchaser should next purchase the first type of good being reached, wherein the additional notification comprises a guidance map that identifies a recommended location to purchase the first type of good.

10. The purchase management guidance system of claim 1, wherein the notification varies based on a difference between a current time at which the purchaser is attempting to purchase the first type of good and the respective target time.

11. The purchase management guidance system of claim 1, wherein the notification comprises a text message presented via a graphical user interface, and the text message comprises the respective target time for the first type of good.

12. The purchase management guidance system of claim 11, wherein the instructions are executable by the one or more processors to cause the one or more processors to instruct output of the notification prior to a shopping trip by the purchaser to purchase the first type of good, periodically, on-demand, or any combination thereof.

\* \* \* \* \*